US 11,531,886 B2

(12) United States Patent
Zhang et al.

(10) Patent No.: US 11,531,886 B2
(45) Date of Patent: Dec. 20, 2022

(54) BAYESIAN GRAPH CONVOLUTIONAL NEURAL NETWORKS

(71) Applicants: Yingxue Zhang, Montreal (CA); Soumyasundar Pal, Montreal (CA); Mark Coates, Montreal (CA); Deniz Ustebay, Westmount (CA)

(72) Inventors: Yingxue Zhang, Montreal (CA); Soumyasundar Pal, Montreal (CA); Mark Coates, Montreal (CA); Deniz Ustebay, Westmount (CA)

(73) Assignees: THE ROYAL INSTITUTION FOR THE ADVANCEMENT OF LEARNING/MCGILL UNIVERSITY, Montreal (CA); HUAWEI TECHNOLOGIES CANADA CO., LTD., Kanata (CA)

( * ) Notice: Subject to any disclaimer, the term of this patent is extended or adjusted under 35 U.S.C. 154(b) by 591 days.

(21) Appl. No.: 16/697,124

(22) Filed: Nov. 26, 2019

(65) Prior Publication Data

US 2021/0158149 A1 May 27, 2021

(51) Int. Cl.
*G06N 3/08* (2006.01)
*G06N 3/04* (2006.01)
*G06K 9/62* (2022.01)

(52) U.S. Cl.
CPC ............. *G06N 3/08* (2013.01); *G06K 9/6226* (2013.01); *G06K 9/6296* (2013.01); *G06N 3/04* (2013.01)

(58) Field of Classification Search
CPC .......... G06N 3/08; G06N 3/04; G06K 9/6226; G06K 9/6296
See application file for complete search history.

(56) References Cited

U.S. PATENT DOCUMENTS 10,706,104 B1 * 7/2020 Lee ..................... G16H 50/20
2021/0133567 A1 * 5/2021 Schiegg ................ G06N 3/08

OTHER PUBLICATIONS

Protein Interface Prediction using Graph Convolutional Networks, Fout, Alex and Byrd, Jonathon and Shariat, Basir and Ben-Hur, Asa, NIPS 2017. 2017.
Anirudh, R., and Thiagarajan, J. J. 2017. Bootstrapping graph convolutional neural networks for autism spectrum disorder classification. arXiv:1704.07487. 2017.
Atwood, J., and Towsley, D. 2016. Diffusion-convolutional neural networks. In Proc. Adv. Neural Inf. Proc. Systems. 2016.
Bresson, X., and Laurent, T. 2017. Residual gated graph convnets. arXiv:1711.07553. 2017.
Bruna, J.; Zaremba, W.; Szlam, A.; and LeCun, Y. 2013. Spectral networks and locally connected networks on graphs. In Proc. Int. Conf. Learning Representations. 2013.
Chen, J.; Ma, T.; and Xiao, C. 2018. FastGCN: fast learning with graph convolutional networks via importance sampling. In Proc. Int. Conf. Learning Representations (ICLR). 2018.

(Continued)

*Primary Examiner* — Fayyaz Alam

(57) ABSTRACT

Method and system for predicting labels for nodes in an observed graph, including deriving a plurality of random graph realizations of the observed graph; learning a predictive function using the random graph realizations; predicting label probabilities for nodes of the random graph realizations using the learned predictive function; and averaging the predicted label probabilities to predict labels for the nodes of the observed graph.

20 Claims, 6 Drawing Sheets

(56) References Cited

OTHER PUBLICATIONS

Defferrard, M.; Bresson, X.; and Vandergheynst, P. 2016. Convolutional neural networks on graphs with fast localized spectral filtering. In Proc. Adv. Neural Inf. Proc. Systems. 2016.

Duvenaud, D.; Maclaurin, D.; et al. 2015. Convolutional networks on graphs for learning molecular fingerprints. In Proc. Adv. Neural Inf. Proc. Systems. 2015.

Frasconi, P.; Gori, M.; and Sperduti, A. 1998. A general framework for adaptive processing of data structures. IEEE Trans. Neural Networks 9(5):768-786. 1998.

Hamilton, W.; Ying, R.; and Leskovec, J. 2017. Inductive representation learning on large graphs. In Proc. Adv. Neural Inf. Proc. Systems. 2017.

Henaff, M.; Bruna, J.; and LeCun, Y. 2015. Deep convolutional networks on graph-structured data. arXiv:1506.05163. 2015.

Kipf, T., and Welling, M. 2017. Semi-supervised classification with graph convolutional networks. In Proc. Int. Conf. Learning Representations. 2017.

Monti, F.; Boscaini, D.; et al. 2017. Geometric deep learning on graphs and manifolds using mixture model CNNs. In Proc. IEEE Conf. Comp. Vision and Pattern Recognition. 2017.

Monti, F.; Shchur, O.; et al. 2018. Dual-primal graph convolutional networks. arXiv:1806.00770. 2018.

Such, F.; Sah, S.; et al. 2017. Robust spatial filtering with graph convolutional neural networks. IEEE J. Sel. Topics Signal Proc. 11(6):884-896. 2017.

Sukhbaatar, S.; Szlam, A.; and Fergus, R. 2016. Learning multiagent communication with backpropagation. In Proc. Adv. Neural Inf. Proc. Systems, 2244-2252. 2016.

Velijckovi'c, P.; Cucurull, G.; Casanova, A.; Romero, A.; Li'o.P.; and Bengio, Y. 2018. Graph attention networks. In Proc. Int. Conf. Learning Representations. 2018.

Li, W; Ahn, S.; and Welling, M. Scalable MCMC for Mixed Membership Stochastic Blockmodels. arXiv:1510.04815V2 [cs. LG] Oct. 22, 2015. 2015.

Gal, Y.; and Ghahramani, Y, Dropout as a Bayesian Approximation: Representing Model Uncertainty in Deep Learning, arXiv:1506.02142v6, Oct. 4, 2016. Oct. 4, 2016.

* cited by examiner

Input: $\mathcal{G}_{obs}, \mathbf{X}, \mathbf{Y}_\mathcal{L}$
Output: $p(\mathbf{Z}|\mathbf{Y}_\mathcal{L}, \mathbf{X}, \mathcal{G}_{obs})$
1: Initialization: train a GCNN to initialize the inference in MMSBM and the weights in the Bayesian GCNN.
2: for $i = 1 : N_G$ do
3:    Perform $N_b$ iterations of MMSBM inference to obtain $(\hat{\pi}, \hat{\beta})$.
4:    Sample graph $\mathcal{G}_i \sim p(\mathcal{G}|\hat{\pi}, \hat{\beta})$.
5:    for $s = 1 : S$ do
6:      Sample weights $W_{s,i}$ via MC dropout by training a GCNN over the graph $\mathcal{G}_i$.
7:    end for
8: end for
9: Approximate $p(\mathbf{Z}|\mathbf{Y}_\mathcal{L}, \mathbf{X}, \mathcal{G}_{obs})$ using eq. (9).

FIG. 5

BAYESIAN GRAPH CONVOLUTIONAL NEURAL NETWORKS

RELATED APPLICATIONS

None

FIELD

This disclosure relates generally to the processing of graph based data using machine learning techniques.

BACKGROUND

A graph is a data structure consisting of nodes and edges that connect the nodes. Each node represents an object (also referred to an instance or event) in a set of objects and each edge represents a relationship that connects two nodes. Processing graphs using machine learning based systems is of growing interest due to the ability of graphs to represent objects and their inter-relationships across a number of areas including, among other things, social networks, financial networks, sets of documents (e.g. citation networks), and physical systems such as wireless communications networks. Machine learning based systems are, for example, being developed for inference tasks on graphs including node classification, regression, link prediction, sub-graph classification and clustering. Machine learning may, for example, be applied to learn a predictive model or function that can provide a label or other predictive output for nodes of a graph or infer a single label for an entire graph.

A raph neural network (GNN) can be trained to learn a model of the dependencies between nodes in a graph. A GNN is a type of artificial neural network (NN) that is configured to operate on the graph domain and can learn to perform inference tasks by considering examples. GNNs typically do not need to be programmed with any task-specific rules. Instead, GNNs learn from the examples they process. Graph convolutional neural networks (GCNNs), which are a type of GNN based on convolution neural network (CNN) techniques, have emerged over the past few years and have proved effective for graph learning.

A GNN can learn a predictive function (also commonly referred to as a predictive model) based on the features of individual nodes as well as the relationships between nodes and thus capture structural information about a graph while incorporating data contained in feature attributes of the nodes and edges. GNNs are applicable to a broad array of problems which require learning from data which have irregular but complex structures. For example, social networks can include nodes that specify social media user metadata, a knowledge graph can include nodes that specify factual data, and a citation network can include nodes that specify paper topics and abstracts. The edge connections between these nodes encode information not contained in any given node alone. A key component of a GNN, and graph-based machine learning systems in general, is an aggregating function which is able to consolidate data for a node as well as its neighbours and produce a succinct mathematical description of the local neighbourhood around the node.

Different GNN configurations (including neural network layers and embedded aggregating functions) have been proposed, some of which are also able to capture global patterns in graph structured data while others are crafted to scale to very large graphs (e.g. graphs having millions of nodes, and billions of edges). However, broadly speaking, almost every GNN assumes that links between nodes reflect homophily, i.e., that connected nodes share common attributes. The design of aggregator functions which take advantage of this assumption has yielded tremendous improvements on learning tasks for graph-structured data.

Although the performance of GNNs has been encouraging, the current implementations of GNNs (including GCNNs) have one or more fundamental limitations.

One limitation is that existing GCNN configurations assume that an input graph represents the ground-truth. In many cases however the graph needs to be derived from noisy data under some modelling assumptions. It is possible that during this process some important links get left out and some spurious links get added causing important deviations from original relationships between nodes.

A second limitation is sensitivity of existing GCNN configurations to error links. The graph topology of a graph is strong prior information, indicating two nodes share similar properties. When an error link exists, the aggregation function will combine features from a different category, which will jeopardize GCNN performance. This can be especially critical in the case of a deep graph convolution architecture in which false neighbor information will propagate to farther nodes, causing cascade side effects.

Another limitation is the overfitting problem. To acquire node embedding, the typical GCNN averages the latent features across the neighbor's latent representation from a previous layer. Given a limited quantity of labelled nodes within a graph, the overfitting problem is severe since each node aggregates the information from the same set of neighbors in each training iteration. This makes it hard to learn general latent features for nodes.

Another limitation is sensitivity to training node selection. In the context of semi-supervised learning, an objective is to use a limited set of labelled nodes in a graph to predict labels for other unlabeled nodes. Thus, the labelled nodes selected during the training process is crucial. If high degree nodes are used for the training set, the correctly labeled information can propagate to more nodes. However, if low degree nodes having a very limited number of neighbors are used for the training set, the graph model learning process is not effective.

Accordingly, there is a need for a machine learning solution that can be applied in the context of graph structured data to address one or more of the limitations noted above.

SUMMARY

According to example aspects, a machine learning system is disclosed that includes a graph generation module that generates multiple random graph realizations of an observed graph, and a predictive function module for predicting labels for the random graph realizations. In at least some examples, the graph generation module applies a Baysian framework to derive the set of random graph realizations of the observed graph. The predictive function module implements a GCNN that learns a predictive function during training using the set of random realizations of the observed graph. In at least some applications, embodiments of the disclosed machine learning system may address one or more of the limitations of existing GCNNs noted above and may provide one or more of the following: a systematic way to measure the uncertainty of the graph structure in the learned predictive function; an effective learned predictive function when a limited amount of labeled nodes are available for training; a learned predictive function that is resilient to random graph perturbations; and a general framework applicable to many different GNN methods used with a graph generative (sampling) algorithm.

According to a first example aspect, there is provided a computer implemented method for predicting labels for nodes in an observed graph. The method includes: deriving a plurality of random graph realizations of the observed graph; learning a predictive function using the random graph realizations; predicting label probabilities for nodes of the random graph realizations using the learned predictive function; and averaging the predicted label probabilities to predict labels for the nodes of the observed graph.

In some example embodiments of the first aspect, deriving a set of random graph realizations comprises learning an generative graph function based on the observed graph, the generative graph function being configured to generate a plurality of probability matrices that each include a respective set of probability values for connections between nodes of the observed graph, and sampling the observed graph using the plurality of probability matrices to generate a respective set of random graph realizations corresponding to each of the probability matrices.

In some example embodiments of the first aspect, the generative graph function comprises an assortative mixed membership stochastic block model (a-MMSBM).

In some example embodiments of the first aspect, the sampling is Bernoulli sampling.

In some example embodiments of the first aspect, learning the predictive function using the random graph realizations comprises learning, for each of the random graph realizations, a respective set of function parameters for the predictive function; and predicting label probabilities for nodes of the random graph realizations comprises predicting, for each random graph realization, the label probabilities for the nodes using the respective set of function parameters learned for the random graph realization.

In some example embodiments of the first aspect, the predictive function is implemented using a graph convolution neural network (GCNN) and the function parameters include weights applied at convolution neural network layers of the GCNN.

In some example embodiments of the first aspect, the respective set of function parameters for each random graph realization includes multiple sets of weights learned for the predictive function, wherein the label probabilities predicted for the nodes of each random graph realization includes a plurality of probabilities predicted based on each of the multiple sets of weights.

In some example embodiments of the first aspect, the multiple sets of weights learned in respect of each random graph realization model are derived from a common set of weights using a Monte Carlo dropout.

In some example embodiments of the first aspect, the predictive function is configured to perform a classification task and the labels predicted for the nodes specify a class from a plurality of possible classes.

In some example embodiments of the first aspect, the predictive function is configured to perform a regression task and the labels predicted for the nodes specify a real-valued response variable.

In some example embodiments of the first aspect, the observed graph is represented as an observed node feature matrix that includes feature vectors in respect of each of the nodes and an observed adjacency matrix that defines connections between the nodes, a subset of the nodes having labels, wherein deriving a plurality of random graph realizations of the observed graph comprises generating a plurality of constrained random variations of the observed node feature matrix.

According to a second example aspect a processing unit is provided for predicting labels for nodes in an observed graph, the processing unit comprising a processing device and a storage storing instructions for configuring the processing device to: derive a plurality of random graph realizations of the observed graph; learn a predictive function using the random graph realizations; predict label probabilities for nodes of the random graph realizations using the learned predictive function; and average the predicted label probabilities to predict labels for the nodes of the observed graph.

According to a third example aspect is a machine learning system comprising: a graph generation module configured to receive as inputs an observed graph and output a plurality of random graph realizations of the observed graph; and a graph convolution neural network configured to learn a predictive function using the random graph realizations to predict label probabilities for nodes of the random graph realizations, and average the predicted label probabilities to predict labels for the nodes of the observed graph.

BRIEF DESCRIPTION OF THE DRAWINGS

Reference will now be made, by way of example, to the accompanying drawings which show example embodiments of the present application, and in which:

FIG. 5 is a pseudo code representation of training and inference actions performed by the machine learning system of FIG. 1.

Similar reference numerals may have been used in different figures to denote similar components.

DESCRIPTION OF EXAMPLE EMBODIMENTS

Figure 1:
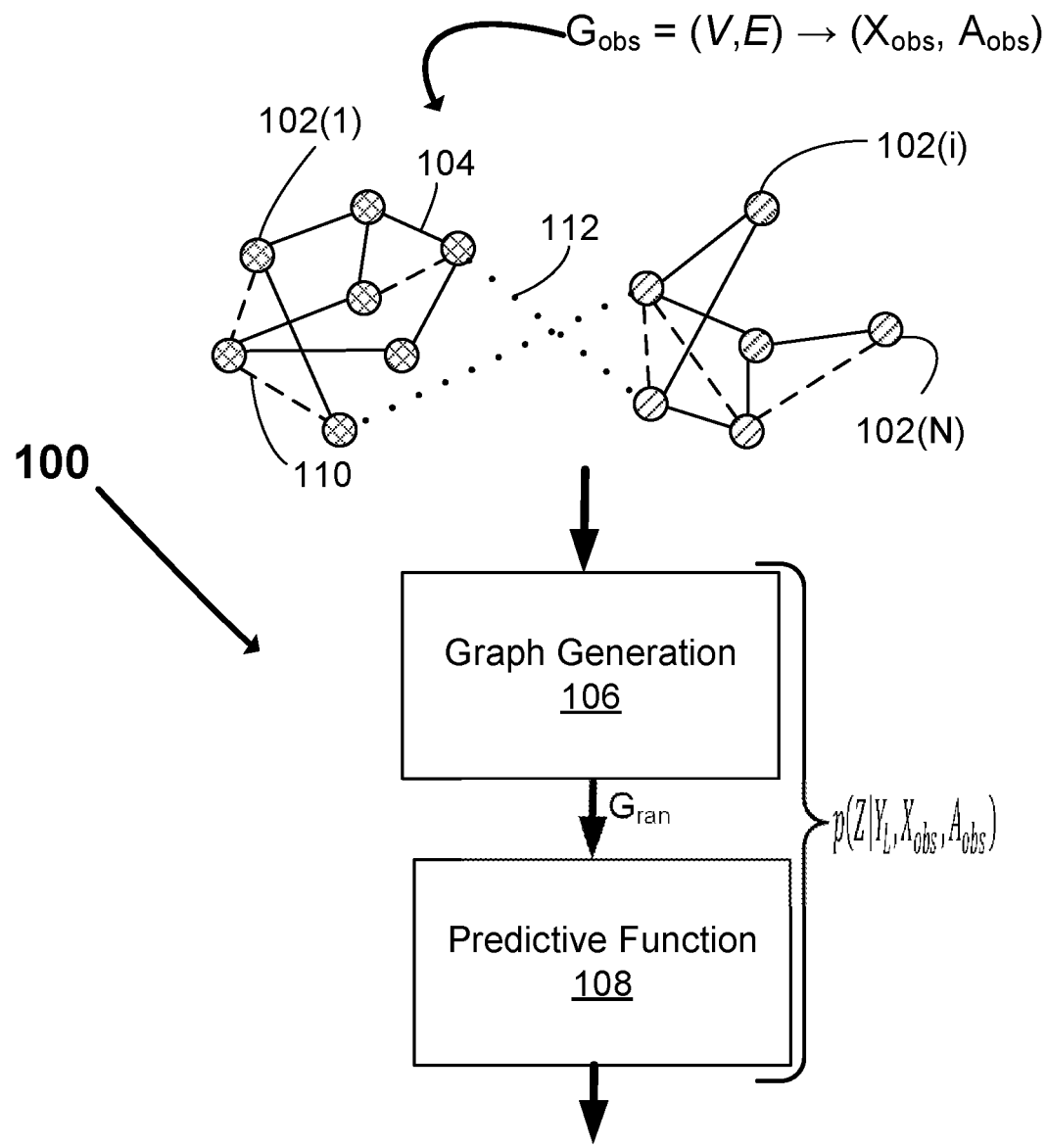
FIG. 1 is a block diagram illustrating an example of a machine learning system for processing graph structured data according to example embodiments.

FIG. 1 illustrates a block diagram of a machine learning system 100 for processing graph structured data according to example embodiments. In the illustrated example, the machine learning system 100 includes a graph generation module 106 and a predictive model or function 108.

FIG. 1 illustrates an observed graph $G_{obs}=(V,E)$, comprised of a set of N nodes V 102(1) to 102(N) (referred to collectively herein as nodes 102 and individually as node 102 or 102(i)) and a set of edges E. Each node 102(i) in the set of nodes 102 V is defined by measured data represented as a feature vector x(i). Graph $G_{obs}$ is a data structure which consists of nodes 102(1), ..., 102(N) and edges 104, 112. Each node 102 represents an observed event or object and each edge 104, 112 represents a relationship that connects two nodes 102. In example embodiments, graph $G_{obs}$ can be represented as $G_{obs}=(X_{obs}, A_{obs})$, where $X_{obs} \in \mathbb{R}^{N \times D}$ is a feature matrix that defines a respective set x(i) of attributes (for example a D dimensional feature vector) for each of the nodes 102(1), ..., 102(N), and $A_{obs} \in \mathbb{R}^{N \times N}$ is an adjacency matrix that defines the connections (edges 104, 112) between the nodes 102(1), ..., 102(N), where N is the number of nodes. Accordingly, the feature matrix $X_{obs}$ includes data for each node 102(i) in the form of a respective D-dimensional feature vector x(i) that includes values for D attributes, and adjacency matrix $A_{obs}$ includes data about the relationships between nodes 102. In some examples, adjacency matrix $A_{obs}$ is an N by N matrix of binary values, with a first binary value indicating the presence of a respective edge linking two respective nodes (e.g. a "1" at matrix location i,j indicating an edge links node i and node j) and a second binary value indicating a lack of a linking edge between two respective nodes (e.g. a "0" at matrix location i,j indicating that there is no edge linking node i and node j). In example embodiments, in addition to identifying the presence or absence of edges 104 between nodes 102, the adjacency matrix $A_{obs}$ may also include or be associated with information that specifies weight and/or directional attributes for the edges 104.

In example embodiments the feature vectors for a subset of the nodes 102 will include or be associated with a target attribute, enabling graph $G_{obs}$ to be used for semi-supervised training. In example embodiments, the target attribute is a label. Thus, in example embodiments, a set of labels $Y_L=\{y(i); i \in L\}$ is known for a subset of the nodes 102 $L \subset V$. In some example embodiments, machine learning system 100 (hereinafter referred to as system 100) is configured to perform a node classification task, in which case label y(i) can be a class (also referred to as a category or community). Thus, in the case where system 100 is configured to perform a node classification task, each label y(i) classifies its respective node as falling within one of K candidate classes. In some examples embodiments, machine learning system 100 is configured to perform a regression task, in which case y(i) can be a real-valued response variable.

In the example embodiments, system 100 is configured to assume that graph $G_{obs}$ has been derived from imperfect observations and/or noisy data and thereby inherently includes some uncertainty. By way of example, graph $G_{obs}$ as observed includes true edges 104 (shown as solid lines) that represent links between neighboring nodes that have been correctly observed and correctly included in adjacency matrix $A_{obs}$, edges 112 (shown as dotted lines) represent spurious edges that have been erroneously observed and erroneously included in adjacency matrix $A_{obs}$, and dashed lines 110 indicate missing edges between nodes that have strong relationships and thus should be linked, but are not, in adjacency matrix $A_{obs}$.

Accordingly, in example embodiments the system 100 is configured to assume that input graph $G_{obs}$ is not a deterministic ground truth. Rather a Bayesian approach is applied and graph $G_{obs}$ is viewed as a realization from a parametric family of random graphs. In this regard, as will be explained in greater detail below, graph generation module 106 is configured to derive a plurality of random graphs $G_{ran}=(X_{obs}, A_{ran})$ that are respective realizations of observed graph $G_{obs}$ based on a set of random graph parameters λ, where $A_{ran}$ represents a set of random adjacency matrices. Predictive function module 108 is configured to predict labels Y for nodes 102 of graph $G_{obs}$ based on an average of the predictions made for the respective nodes 102 across the graphs $G_{ran}$.

The predictions made by predictive function module 108 are defined by a set of learnable function parameters or weights (W). As will be described in greater detail below, the predictive function module 108 is configured to generate probability matrices for each of the graphs in the set of random graphs $G_{ran}$, using multiple sets of weights for each of the random graphs $G_{ran}$ and then determine a final probability matrix based on an average of the inferences made for the respective nodes 102 across the graphs $G_{ran}$.

Accordingly, as will be described in greater detail below, in example embodiments the system 100 is trained through inference of the joint posterior of random graph parameters λ, weights W, training label set $Y_L$ and the observed graph $G_{obs}=(X_{obs}, A_{obs})$, to approximate the following equation (1):

$$p(Z|Y_L, X_{obs}, A_{obs}) = \int p(Z|W, X_{obs}, A_{ran}) p(W|Y_L, X_{obs}, A_{ran})$$
$$p(A_{ran}|\lambda) p(\lambda|X_{obs}, A_{obs}) dW dA_{ran} d\lambda \qquad \text{Equation (1)}$$

Figure 2:
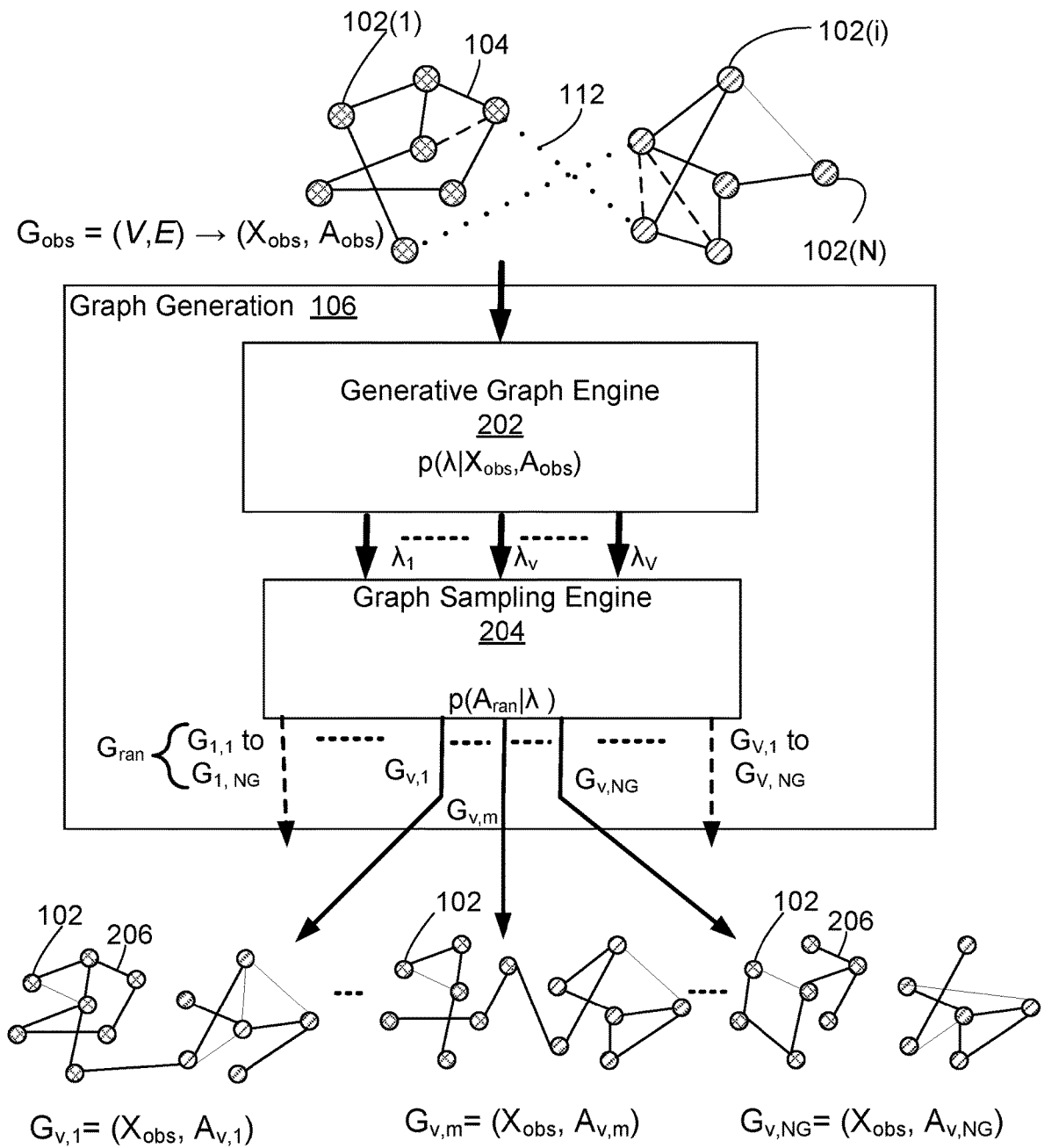
FIG. 2 is a block diagram illustrating an example of a graph generation module of the machine learning system of FIG. 1.

Graph generation module 106 will now be described in greater detail with reference to FIG. 2. Graph generation module 106 includes an generative graph engine 202 that predicts, based on the observed graph $G_{obs}=(X_{obs}, A_{obs})$, a parameter set A that comprises a number V of parameter matrices $\{\lambda_1, ..., \lambda_v, ..., \lambda_V\}$. The operation performed by the generative graph engine 202 is represented as:

$$p(\lambda|X_{obs}, A_{obs}) \qquad \text{Equation (2)}$$

Each of the V parameter matrices $\{\lambda_1, ..., \lambda_v, ..., \lambda_V\}$ includes a matrix of probability values indicating the probability that an edge or link exists between two respective nodes 102. Accordingly, the generative graph engine 202 is configured to output V probability matrices $\{\lambda_1, ..., \lambda_v, ..., \lambda_V\}$ based on the node attribute information and edge information that is included in the observed node feature matrix $X_{obs}$ and adjacency matrix $A_{obs}$. In example embodiments, the number V is a user configurable hyper-parameter (1≤v≤V).

Thus, in example embodiments, generative graph engine 202 is configured to learn a set of V adjacency probability matrices $\{\lambda_1, ..., \lambda_v, ..., \lambda_V\}$ that model properties of the observed adjacency matrix $A_{obs}$ of observed graph $G_{obs}$. In example embodiments, the V adjacency probability matrices may be randomly derived to fit within a predetermined statistic distribution (for example, Gaussian distribution) of the observed adjacency matrix $A_{obs}$.

In some examples, the generative graph engine 202 implements an assortative mixed membership stochastic block model (a-MMSBM). An example of an a-MMSBM is described in Li, W; Ahn, S.; and Welling, M. "Scalable MCMC for Mixed Membership Stochastic Blockmodels", arXiv:1510.04815V2 [cs.LG] 22 Oct. 2015, which is incorporated herein by reference. In this regard, in example embodiments the parameter set A includes two sets of parameters, namely $\{\pi, \beta\}$. The generative graph engine 202 is configured to learn parameter set $\lambda=\{\pi, \beta\}$ using a stochastic optimization approach that generalizes a stochastic block model by allowing nodes 102 to belong to more than one community and exhibit assortative behaviour, meaning that a node can be connected to one neighbour because of a relationship through community A and to another neighbor because of a relationship through community B.

For an undirected observed graph $G_{obs}=\{y_{ab} \in \{0,1\}: 1 \leq a < b \leq N\}$, $y_{ab}=0$ or 1 indicates absence or presence of a link between node a and node b. Each node a has a K dimensional community membership probability distribution $\pi_a=[\pi_{a1}, ..., \pi_{aK}]^T$ where K is the number of candidate categories of nodes. For any two nodes a and b, if both of them belong to the same category (category can also be referred to as community), then the probability of a link between them is significantly higher than the case where the two nodes belong to different categories. The operation of generative graph engine 202, in example embodiments, can be described as:

For any two nodes a and b:
Sample $z_{ab} \sim \pi_a$ and $z_{ba} \sim \pi_b$.
If $z_{ab} = z_{ba} = k$, sample a link $y_{ab} \sim$ Bernoulli $(\beta_k)$. Otherwise $y_{ab} \sim$ Bernoulli $(\delta)$.

Where: $0 \leq \beta_k \leq 1$ is termed community strength of the k-th community and $\delta$ is the cross community link probability (a small value). The joint posterior of the parameters $\pi$ and $\beta$ is given as:

$$p(\pi,\beta|G_{obs}) \propto p(\beta)p(\pi)p(G_{obs}|\pi,\beta) = \Pi_{k=1}^{K} p(\beta_k) \Pi_{a=1}^{N} p(\pi_a) \Pi_{1 \leq a < b \leq N} \Sigma_{z_{ab}, z_{ba}} p(y_{ab}, z_{ab}, z_{ba}|\pi_a, \pi_b, \beta) \quad \text{Equation (3)}$$

A Beta($\eta$) distribution can be used for the prior of $\beta_k$ and a Dirichlet distribution, Dir($\alpha$), for the prior of $\pi_a$, where $\eta$ and $a$ are pre-defined hyper-parameters.

Maximizing the posterior of equation (3) is a constrained optimization problem with $\beta_k$, $\pi_{ak} \in (0,1)$ and $\Sigma_{k=1}^{K} \pi_{ak} = 1$. Because a standard iterative algorithm with a gradient based update rule will not guarantee that the constraints will be satisfied, in example embodiments an expanded mean parameterization is employed as follows. Alternative parameters $\theta_{k0}$, $\theta_{k1} \geq 0$ are introduced and adopted as the prior for parameter $\beta_k$ using the product of independent Gamma($\eta, \rho$) distributions. These substitute parameters are related to the original parameter $\beta_k$ through the relationship $$\beta_k = \frac{\theta_{k1}}{\theta_{k0} + \theta_{k1}}.$$

This results in a Beta($\eta$) prior for $\beta_k$. An additional new parameter $\emptyset_a \in \mathbb{R}_+^K$ is introduced and adopted as the prior for $\pi_{ak}$ using the product of independent Gamma($\alpha, \rho$) distributions. In this regard, $\pi_{ak} = \Pi_{ak} / \Sigma_{l=1}^{K} \Pi_{al}$, which results in a Dirichlet prior, Dir($\alpha$) for $\pi_a$. The boundary conditions $\theta_{ki}$, $\Pi_{ak} \geq 0$ are handled by taking the absolute value of the update.

In example embodiments, generative graph engine 202 is configured to use a preconditioned gradient ascent to maximize the joint posterior in equation (3) over $\theta$ and $\Pi$. In many graphs that are appropriately modelled by a stochastic block model, most of the nodes belong strongly to only one of the K communities, so the estimate for many $\pi_a$ lies near one of the corners of the probability simplex, suggesting that the scaling of different dimensions of $\emptyset_a$ can be very different. Similarly, as the observed graph $G_{obs}$ is often sparse, the community strengths $\beta_k$ are very low, indicating that the scales of $\theta_{k0}$ and $\theta_{k1}$ are very different. Preconditioning matrices $G(\theta) = \text{diag}(\theta)^{-1}$ and $G(\emptyset) = \text{diag}(\emptyset)^{-1}$ can be used to obtain the following update rules:

$$\theta_{ki}^{(t+1)} = \left| \theta_{ki}^{(t)} + \epsilon_t \left( \eta - 1 - \rho \theta_{ki}^{(t)} + \theta_{ki}^{(t)} \sum_{a=1}^{N} \sum_{b=a+1}^{N} g_{ab}(\theta_{ki}^{(t)}) \right) \right| \quad \text{Equation (4)}$$

$$\phi_{ak}^{(t+1)} = \left| \phi_{ak}^{(t)} + \epsilon_t \left( \alpha - 1 - \rho \phi_{ak}^{(t)} \sum_{b=1, b \neq a}^{N} g_{ab}(\phi_{ak}^{(t)}) \right) \right|, \quad \text{Equation (5)}$$

where $\epsilon_t = \epsilon(t+\tau)^{-K}$ is a decreasing step-size, and $g_{ab}(\theta_{ki})$ and $g_{ab}(\emptyset_{ak})$ are the partial derivatives of log $p(y_{ab}|\pi_a, \pi_b, \beta)$ w.r.t. $\theta_{ki}$ and $\emptyset_{ak}$, respectively. Detailed expressions for these derivatives are provided in eqs. (9) and (14) of (Li, Ahn, and Welling 2016).

Direct application of Equations (4) and (5) would require $\mathcal{O}(N^2 K)$ operations per iteration, where N is the number of nodes in the graph and K the number of communities. This large number of operations may be prohibitively ex-pensive for large graphs, and accordingly in example embodiments a stochastic gradient based strategy is applied as follows. For update of $\theta_{ki}$'s in equation (4), the $\mathcal{O}(N^2)$ sum is split over all edges and non-edges, $\Sigma_{a=1}^{N} \Sigma_{b=a+1}^{N}$, into two separate terms. One of these is a sum over all observed edges and the other is a sum over all non-edges. The term corresponding to observed edges is calculated exactly using all observed edges (in the sparse graphs of interest, the number of edges is closer to $\mathcal{O}(N)$ than $\mathcal{O}(N^2)$). For the term corresponding to non-edges, a mini-batch of 1 percent of randomly sampled non-edges is used, and the mini-batch sum scaled by a factor of 100.

At any single iteration, the $\emptyset_{ak}$ values are updated for only n randomly sampled nodes (n<N), keeping the rest of the values fixed. For the update of $\emptyset_{ak}$ values of any of the n randomly selected nodes, the sum in equation (5) is split into two terms, namely a first term for all of the neighbours of node a (the set of neighbours of node a being denoted by $\mathcal{N}(a)$), and a second term for all of the non-neighbours of node a. The first term is calculated exactly using all neighboring nodes. The second term is calculated using the sum of only $n - |\mathcal{N}(a)|$ randomly sampled non-neighbour nodes and the result scaled by a factor of $$\frac{N - 1 - |\mathcal{N}(a)|}{n - |\mathcal{N}(a)|}$$

to maintain unbiasedness of the stochastic gradient. As a result, updating the $\phi$ values involves $\mathcal{O}(n^2 K)$ operations instead of the $\mathcal{O}(N^2 K)$ opratuons required for a full batch update.

In example embodiments, the posterior calculated by a-MMSBM implemented in the generative graph engine 202 will often be very high-dimensional. As a result, in some applications random initialization of the parameter set $\lambda = \{\pi, \beta\}$ may not be practical. Thus, in some example embodiments, during an initialization procedure for system 100, the predictive function 108 is trained on $G_{obs}$ directly and an output of the predictive function 108 used to initialize $\pi$ and then $\beta$ is initialized based on a block structure imposed by $\pi$.

Accordingly, generative graph engine 202 is configured to learn probability parameter set $\lambda = \{\pi, \beta\}$ for input graph Gobs=$(X_{obs}, A_{obs})$. Parameter set $\lambda$ comprises V parameter matrices $\{\lambda_1, \ldots, \lambda_\nu, \ldots, \lambda_V\}$ that collectively characterize family $G_{ran}$ of random graphs. Graph generation module 106 further includes a graph sampling engine 204 that is configured to sample observed graph $G_{obs}$ using parameter set $\lambda = \{\pi, \beta\}$ to generate sampled graphs that comprise random graph family $G_{ran}$.

In this regard, as a first step, graph sampling engine 204 applies Bernoulli sampling to generate $V * N_G$ random adjacentcy matrices $A_{1,1}$ to $A_{V,NG}$. In particular, graph sampling engine 204 is configured to use Bernoulli sampling to generate $N_G$ adjacency matrices $\{A_{v,1}, \ldots, A_{v,k}, \ldots, N_{v,NG}\}$ for each one of the V probability matrices $\{\lambda_1, \ldots, \lambda_v, \ldots, \lambda_V\}$ In this regard, the bottom of FIG. 2 graphically illustrates an example of the $N_G$ adjacency matrices $\{A_{v,1}, \ldots, A_{v,m}, \ldots, A_{v,NG}\}$ generated in respect of one of the V probability matrices (probability matrix $\lambda_v$) using Bernoulli sampling, where $1 \leq m \leq N_G$. Each of the $N_G$ adjacency matrices $\{A_{v,1}, \ldots, A_{v,k}, \ldots, A_{v,NG}\}$ is a respective sample based on the probability values specified in probability matrix $\lambda_v$. For example, probability matrix $\lambda_v$ may specify a probability (e.g. a real value from 0 to 1) that an edge exists between node 102(i) and 102(j). For each possible node pair, the resulting $N_G$ adjacency matrices $\{A_{v,1}, \ldots, A_{v,k}, \ldots, A_{v,NG}\}$ will include a respective binary value indicating the relationship between the two nodes (e.g. for node 102(i) and 102(j), a "1" at location i,j=edge exists or "0" at location i,j=no edge), where the value is determined independently for each of the $N_G$ samples. As graphically represented in FIG. 2, each of the adjacency matrices $\{A_{v,1}, \ldots, A_{v,k}, \ldots, A_{v,NG}\}$ includes a different configuration of edges 206 linking the nodes 102.

Accordingly, the graph generation module 106 generates a family or set of $V^*N_G$ random graphs $G_{ran}$ that form a Bayesian representation of the observed graph $G_{obs}$.

Figure 3:
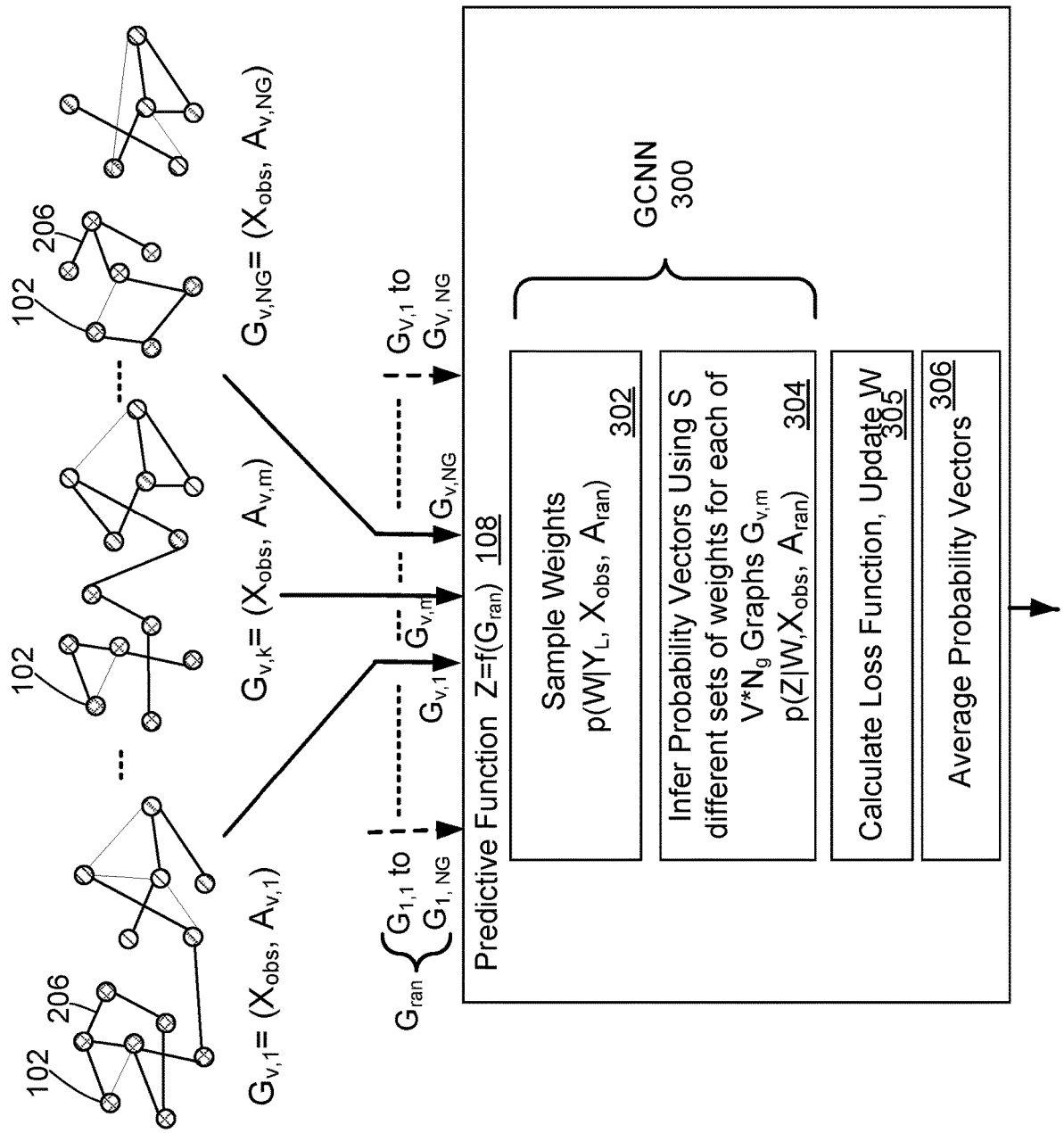
FIG. 3 is a block diagram illustrating an example of a predictive function of the machine learning system of FIG. 1.

As $G_{obs}$ is often noisy and may not fit an adopted parametric block model well, sampling $\lambda = \{\pi, \beta\}$ from $p(\lambda|X_{obs}, A_{obs})$ can lead to high variance. This can lead to the sampled graphs $G_{v,m}$ being very different from $G_{obs}$. Accordingly, in some example embodiments, a maximum a posteriori estimate is used in place of integration, and in this regard, approximate values are computed for $\pi, \beta$ as follows:

$$\{\hat{\pi}, \hat{\beta}\} = \underset{\beta,\pi}{\mathrm{argmax}}\, p(\beta, \pi \mathcal{G}_{obs}),$$

and the graph sampling engine 204 samples from $p(A_{ran}|\hat{\pi}, \hat{\beta})$ The set of $V^*N_G$ random graphs $G_{ran}$ are then provided as inputs to the predictive function module 108, an example of which is represented by a functional block diagram in FIG. 3. Each random graph $G_{v,k}$ (where $1 \leq v \leq V$ and $1 \leq k \leq N_G$) is defined by the observed node feature vector matrix $X_{obs}$ and a respective stochastically generated adjacency matrix $A_{v,k}$. Furthermore, as noted above, a subset of the nodes in node feature vector matrix $X_{obs}$ are training nodes that have been pre-labelled with an appropriate classification label or real-valued variable label (e.g. labels $Y_L$).

Generally, predictive function module 108 implements a predictive function $Z=f(G_{ran})$, that is learned during a training phase, using the feature vectors $x_i$ included as rows in node feature matrix $X_{obs}$, and connection information included in adjacency matrices $X_{ran}$, to predict the labels of unlabeled nodes 102 of graph $G_{obs}$. In this regard, the predictive function implemented by the predictive function module 108 outputs a probability matrix Z. The probability matrix Z includes, for each node 102(i) instance in feature vector matrix $X_{obs}$, a probability metric $p_i$ that indicates the relative probability for each of a plurality (K) of possible candidate classifications (e.g. labels) for the node 102(i). In an example embodiment, the probability metric p is a K-dimensional probability vector which indicates the probability distribution across K candidate classes for each of the respective nodes 102. In some example embodiments, the probability metric $p_i$ is a softmax which indicates the normalized probability distribution across K candidate classes for each of the respective nodes 102. The learnable function 305 infers probability matrix Z=f(X,A) based on a set of parameters, referred to above as weights W. The weights W are set to initial values and then subsequently trained to optimize performance of the learned predictive function.

In an example embodiment, the predictive function $Z=f(G_{ran})$ is learned using a graph convolutional neural network (GCNN) 300 configured to process graph structured data consisting of nodes and edges. In this regard, GCNN 300 includes convolution neural network (CNN) layers interspersed with aggregating functions. Node classification is performed through aggregating information within local node neighbourhoods. The aggregated information is summarized in feature vectors extracted by the layers of the GCNN 300 and these higher-order feature vectors (or node embeddings) capture similarities between nodes.

By way of context, as described in the following documents, the contents of which are incorporated herein by reference: Defferrard, M.; Bresson, X.; and Vandergheynst, P. 2016, "Convolutional neural networks on graphs with fast localized spectral filtering", In Proc. Adv. Neural Inf. Proc. Systems.; and Kipf, T., and Welling, M. 2017, "Semi-supervised classification with graph convolutional networks", In Proc. Int. Conf. Learning Representations, in general the layers of a GCNN may be represented as:

$$H^{(1)} = \sigma(A_G X W^{(0)}) \quad \text{Equation (5); and}$$

$$H^{(l+1)} = (A_G H^{(l)} W^{(l)}) \quad \text{Equation (6)}$$

In equations (5) and (6), $W^{(l)}$ are the weights of the GCNN at layer l, $H^{(l)}$ are the output features from layer l-1 and σ is a non-linear activation function. Adjacency matrix $A_G$ is derived from the input graph and determines how output features are mixed across the graph at each layer. The final output for an L-layer GCNN is Z=H(L). Training of the weights of the GCNN is performed by backpropagation with the goal of minimizing an error metric between the observed labels $Y_L$ and the network predictions Z. Performance improvements can be achieved by enhancing the architecture with components that have proved useful for standard CNNs, including attention nodes and skip connections and gates.

As noted above, in system 100, the input provided to predictive function module 108 is not a single graph that is a direct representation of observed graph $G_{obs}$. Rather, the input to predictive function module 108 comprises the $V^*N_G$ graph realizations of random graph family $G_{ran}$, generated using the a-MMSBM implemented by graph generation module 106 and in this regard, GCNN 300 is configured to process each of the graphs $G_{v,m}$ independently using S different sets of weights. Accordingly, as indicated by block 304, GCNN 300 learns to predict $S^*V^*Ng$ probability vectors by using S different sets of weights for each of the $V^*N_g$ Graphs $G_{v,m}$. Thus, processing observed graph $G_{obs}$ by system 100 results in learning of $S^*V^*Ng$ sets of weights. Accordingly, the weight parameters W includes sets of weights $W_{s,m,v}$, where: $s=\{1, \ldots, S\}$, $v=\{1, \ldots, V\}$, and $m=\{1, \ldots, N_G\}$.

Each set of weights $W_{s,m,v}$ applied by GCNN in a respective graph $G_{v,m}$ is generated by sampling the posterior of the weights W, as indicated by block 302 and represented by equation (7):

$$p(W|Y_L, X_{obs}, A_{ran}) \quad \text{Equation (7)}$$

Each set of weights $W_{s,v,k}$ is a respective matrix derived by randomly dropping a predefined number of individual weight values (e.g. setting random weight values to zero) from an initial weight matrix $W_{init}$. For example, a Monte Carlo drop-out algorithm having a predefined drop-out value can be applied to weight matrix $W_{init}$ to randomly generate different sets of weights $W_{s,v,m}$. GCNN 300 is trained to predict probability vectors for each graph $G_{v,m}$ for each of a respective S sets of weights $W_{s,v,m}$. As indicated in block 305, a loss function is calculated in respect of the labels corresponding to each sets of weights $W_{s,v,m}$ and each set of weights is then updated, with the process continuing until each set of weights $W_{s,v,m}$ is optimized. According, GCNN is effectively trained to implement a total of $S*V*N_G$ learned predictive function instances, each of which is defined by respective set of learned weights $W_{s,v,m}$ to predict a respective probability vector.

As indicated by block 306, after learning all weights $W=(W_{1,1,1} \ldots, W_{s,m,v} \ldots, W_{S,NG,V})$, a final probability vector Z is then calculated by averaging together all of the $S*V*N_G$ probability vectors. Accordingly, the probability vector Z output generated by system 100 can be represented by equation (8):

$$p(Z|Y_L, X_{obs}, A_{obs}) \approx \frac{1}{V}\sum_{v=1}^{V} \frac{1}{N_G S}\sum_{m=1}^{N_G}\sum_{s=1}^{S} p(Z|W_{s,m,v}, A_{m,v}, X_{obs})$$

Equation (8)

Equation (8) approximates Equation (1).

Accordingly, as described above, machine learning system 100 employs a Bayesian framework to view the observed graph as a random realization from a generative graph model. In at least some example applications, machine learning system 100 may accomplish one or more of the following: provide a systematic approach for measuring the uncertainty of a graph structure; provide an effective GCCN function when a limited amount number of training data is available; be resilient to random graph perturbations; and be applied to a wide variety of GNN methods used with a graph generative (sampling) algorithm. In at least some example embodiments the machine learning system 100 may enable a hosting computer system to use fewer computational and/or memory resources to label unstructured graph data than is possible with existing solutions. In some examples, machine learning system 100 may more accurate labelling to be applied to nodes of a graph in a computationally efficient manner.

Figure 4:
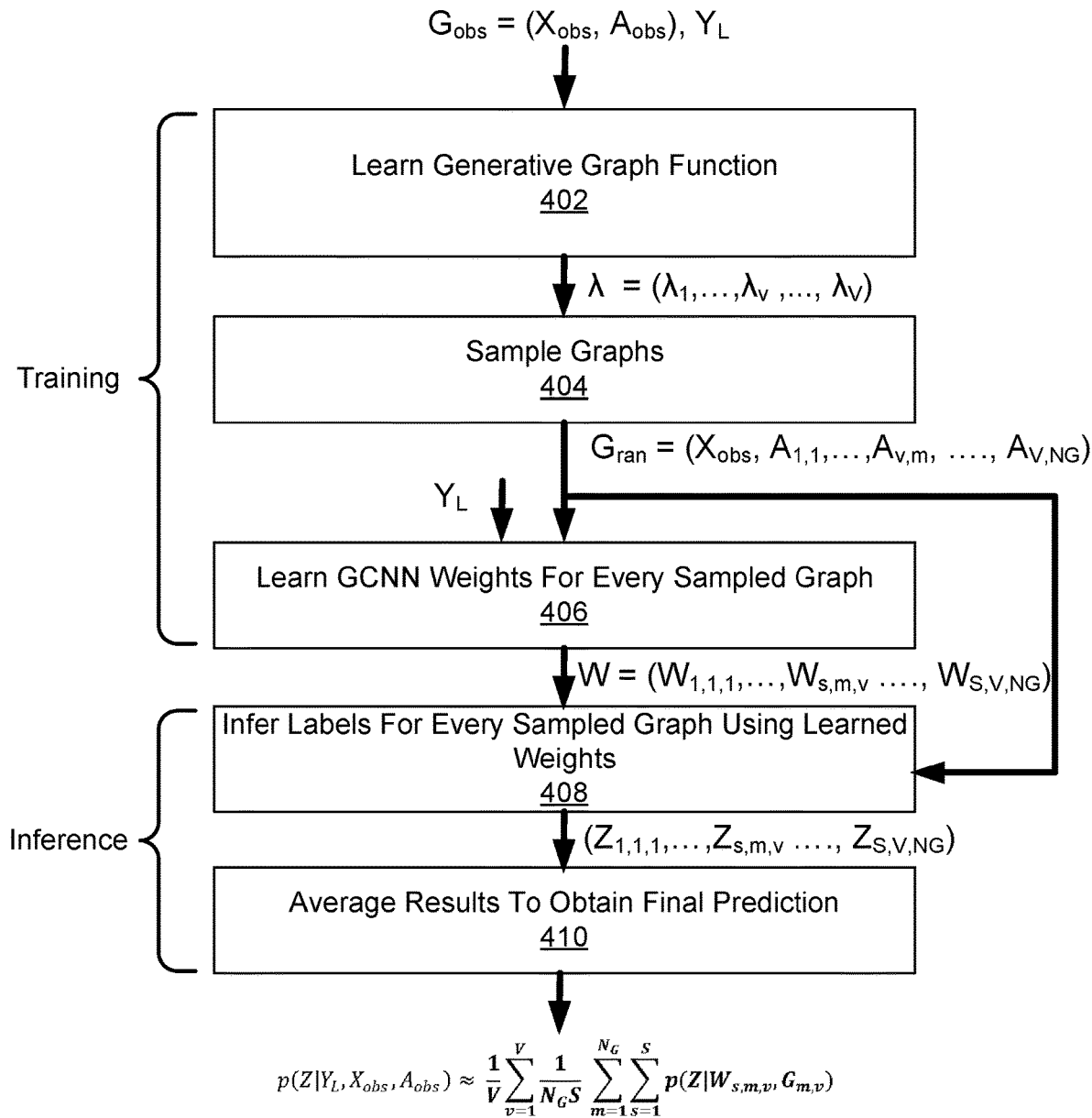
FIG. 4 is a flow diagram representing a method performed by the machine learning system of FIG. 1.

Training of and inference by machine learning system 100 will now be summarized with reference to the flow diagram of FIG. 4. The inputs to machine learning system 100 include the node feature matrix $X_{obs}$ and adjacency matrix $A_{obs}$ of observed graph $G_{obs}=(X_{obs}, A_{obs})$, and training labels $Y_L$ for a subset of the nodes 102.

As indicated in block 402, a generative graph function is learned. In particular, a set of V adjacency probability parameters $\lambda=(\lambda_1, \ldots, \lambda_v, \ldots, \lambda_V)$ is learned by training generative graph engine 202 that is implemented using an a-MMSBM. Each parameter is slightly different from the others but comes from the same graph generative model family. As indicated in block 404, the learned parameters $\lambda=(\lambda_1, \ldots, \lambda_v, \ldots, \lambda_V)$ are then each applied $N_g$ times using Bernoulli graph sampling to generate $V*Ng$ random adjacency matrices $A_{ran}=(A_{1,1}, \ldots, A_{v,m}, \ldots, A_{V,NG})$. Together with the observed node feature matrix $X_{obs}$, the adjacency matrices $A_{ran}$ provide a random graph family $G_{ran}=(X_{obs}, A_{1,1}, \ldots, A_{v,m}, \ldots, A_{V,NG})$ that represent constrained random variations of the observed graph $G_{obs}$. In this regard, graph generation module 106 learns a graph generative model (e.g. engine 202) for the observed graph $G_{obs}$, and then samples from the posterior of the graph generative model using the different parameters $(\lambda_1, \ldots, \lambda_v, \ldots, \lambda_V)$ to provide random graph family $G_{ran}=(X_{obs}, A_{1,1}, \ldots, A_{v,m}, \ldots, A_{V,NG})$. Each sampled graph captures a collection of different relationships between nodes. At the same time, all the sampled graphs carry the uncertainty of the observed graph.

As indicated in block 406, a set of GCCN weights W are then learned. In some examples, S sets of GCCN weights are learned for each of the V*Ng sampled graphs, resulting in a set of learned GCCN weights $W=(W_{1,1} \ldots, W_{s,m} \ldots, W_{S,NG})$ corresponding to graphs sampled for each one of the V probability parameters $(\lambda_1, \ldots, \lambda_v, \ldots, \lambda_V)$.

Once the GCCN weights W are learned, training of GCCN 400 is complete and the GCCN 400 used for an inference task. As indicated by block 408, the learned GCCN weights W are applied to the respective sampled graphs of random graph family $G_{ran}=(X_{obs}, A_{1,1}, \ldots A_{v,m}, \ldots A_{V,NG})$ to predict a plurality of respective probability vectors $(Z_{1,1,1}, \ldots, Z_{s,m,v} \ldots, Z_{S,V,NG})$. As indicated at block 410, a final prediction of probability vector Z is calculated based on the average performance from every sampled graph and its corresponding set of GCCN weights. For classification implementations where the inference task is classification, the predictive function module 108 can be configured to output the prediction of the category membership among a set of K categories for each node 102. For implementations where the inference task is regression, the predictive function module 108 can be configured to output predicted real valued variable for each node.

Accordingly, in example embodiments the final prediction of system 100 is based on the prediction results coming from a set of different graphs, which are sampled from a graph generative function. In example embodiments, the learned weights W of system 100 can be stored in digital storage of a processing unit of a computing device. Furthermore, the category labels or other target attribute assigned to each node 102 by system 100 can be stored in digital storage of a processing unit of a computing device, thereby providing a fully labelled graph.

A pseudo-code representation of a process that performed by processing unit to implement aspects of system 100 is illustrated in FIG. 5. In particular, FIG. 5 illustrates a training and inference process that can be performed for a set of graphs sampled in respect of one of the V parameter matrices, $\lambda_v$. In FIG. 5, the notation "$\mathcal{G}$" is used in place of "A" and "i" used in place of "m", and Equation (9) is as follows:

$$\frac{1}{N_G S}\sum_{i=1}^{N_G}\sum_{s=1}^{S} p(Z|W_{s,i}, G_i, X).$$

Equation (9)

As described above, in example embodiments the system 100 can be is applied in the context of semi-supervised training, including for example a scenario in which nodes in a graph need to be classified based on a limited set of labeled nodes. For example, in citation networks each article belongs to an area of research and two articles are connected by a link when one of the articles cite the other one. Each article is represented by a node on the graph and the citation links are represented by edges. The area of research is the class of document. The system 100 can be used goal is to infer the class of documents when only few labeled documents are known.

Another example application for system 100 may be to predict the performance of a Wi-Fi network using graph-based learning methods to measure the interaction between nodes. Traditional methods for predicting Wi-Fi performance assume that each access point in a Wi-Fi network is independent from all other access points. However, a more reasonable model should consider the interaction and interference between access points since two nearby access points will generate interference between themselves when they work on a similar bandwidth. A network management problem is to decide which access point among an interfering pair or group of access points should process the interfering signals. In a traditional GCCN, the machine learning process is deterministic in the sense that the interaction relationship between access points is pre-determined, based on modeling assumptions or strong prior knowledge. Thus, traditional machine learning cannot model the uncertainty of the interaction relationship between access points. System 100 may apply a probabilistic formulation to model the uncertainty of the relationship between different access points.

Accordingly, machine learning system 100 employs a Bayesian framework and views the observed graph as a random realization from a generative graph model. Multiple sets of weights are then learned in respect of each of a plurality of sampled graphs that are generated by the generative graph model. The learned weights are then used to infer probability vectors for each of the sampled graphs, and the probability vectors averaged to predict final labels for the nodes of the observed graph.

In at least some example applications, machine learning system 100 may provide a systematic approach to account for the uncertainty of a graph structure. As indicated above, prior graph-based learning methods generally assume that the given topology of the data represents the ground-truth. However, the given graph is usually derived from noisy data. It is possible that during this process some important links get left out and some spurious links get added causing important deviations from original relationships between nodes. When an explicit topology of the data is not available, a common approach is to construct a graph structure under some modelling assumptions or prior knowledge. In contrast, in example embodiments, system 100 incorporates the uncertainty of the graph structure into the training process instead of simply using the given topology as the ground-truth. This is done by using a Bayesian approach in which the observed graph is viewed as a realization from a parametric family of random graphs, and then training the system 100 based on the joint posterior of random graph parameters, and the node labels. By averaging the predictions coming from different graphs, the uncertainty of the graph structure is considered.

In at least some example applications, system 100 may provide an effective predictive function learned by a GCCN when a limited amount of labelled training nodes are available. In particular, during each training iteration, a different sampled graph coming from the same random graph family is used to learn the predictive function. Even when a very limited number of labelled training nodes are provided, at each iteration, latent features are aggregated from different and diverse neighbors, enabling the GCCN to learn more general node embeddings with very limited labelled training nodes.

In at least some example applications, machine learning system 100 may be resilient to random graph perturbations. In this regard, a purpose of the adjacency matrix inference function is to learn a graph generation model, so that similar graphs can be sampled from the same graph family. Thus, even if error links exist for a certain node, it is possible to draw more neighbors that belong to the same category as the certain node. This may alleviate the negative impact from spurious links on the system performance.

In at least some examples, the systems and methods described above and be applied to a wide variety of GNN methods used with a graph generative (sampling) algorithm. In the described examples, an a-MMSBM is used to generate a random graph family. However graph generation module 106 may implement other graph inference and generation models, such as GVAE or GraphRNN.

In at least some example embodiments, the system 100 may enable a hosting computer system to use fewer computational and/or memory resources to label unstructured graph data than is possible with existing solutions. In some examples, system 100 may enable more accurate labelling to be applied to nodes of a graph in a computationally efficient manner.

Figure 6:
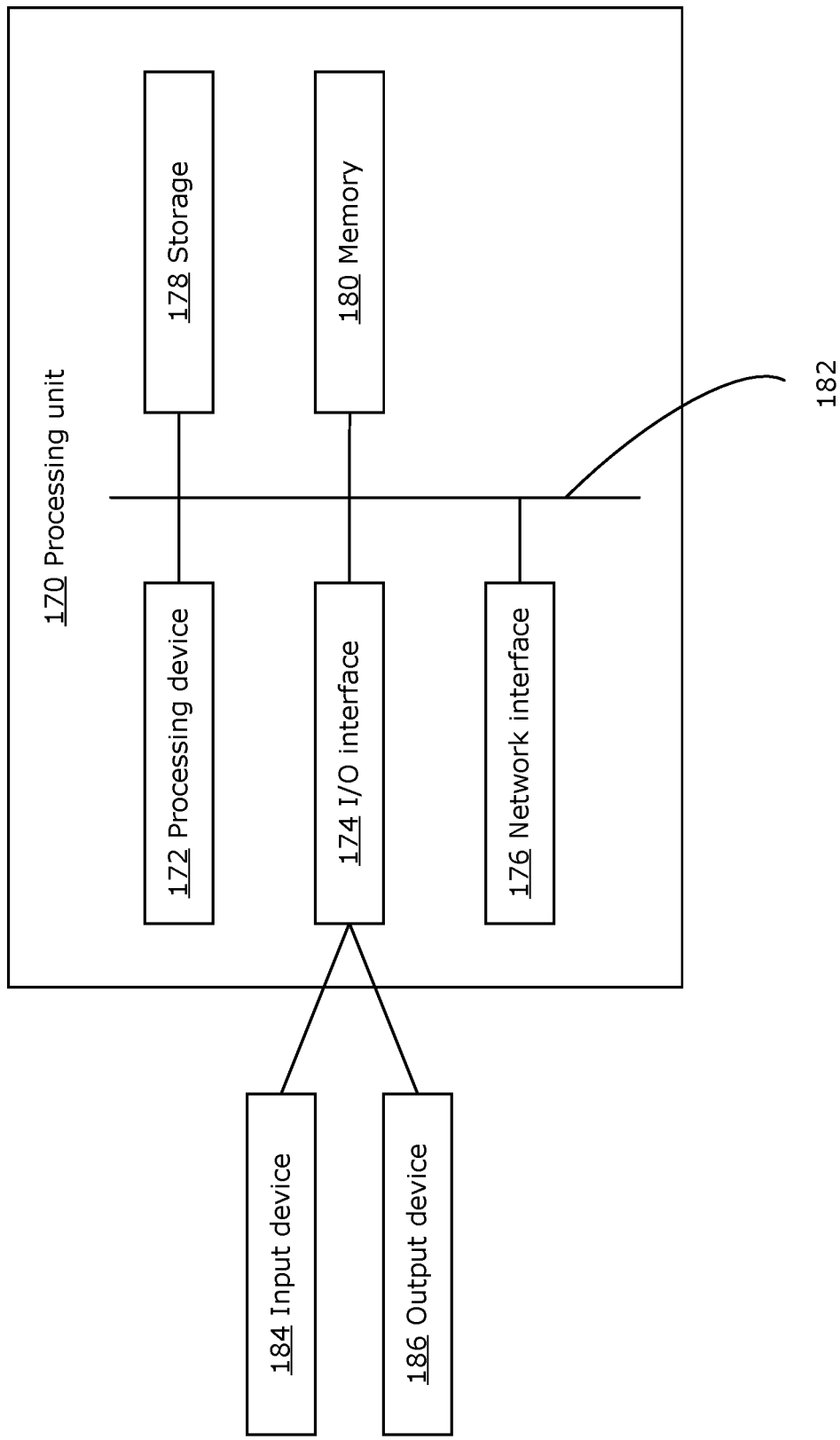
FIG. 6 is a block diagram illustrating an example processing system that may be used to execute machine readable instructions to implement the system of FIG. 1.

FIG. 6 is a block diagram of an example processing unit 170, which may be used in a computer device to execute machine executable instructions of system 100. Other processing units suitable for implementing embodiments described in the present disclosure may be used, which may include components different from those discussed below. Although FIG. 6 shows a single instance of each component, there may be multiple instances of each component in the processing unit 170.

The processing unit 170 may include one or more processing devices 172, such as a processor, a microprocessor, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network.

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure are incorporated herein by reference.

The invention claimed is:

1. A computer implemented method for predicting labels for nodes in an observed graph, comprising:
    deriving a plurality of random graph realizations of the observed graph;
    learning a predictive function using the random graph realizations;
    predicting label probabilities for nodes of the random graph realizations using the learned predictive function;
    averaging the predicted label probabilities to predict labels for the nodes of the observed graph.

2. The method of claim 1 wherein deriving a set of random graph realizations comprises:
    learning an generative graph function based on the observed graph, the generative graph function being configured to generate a plurality of probability matrices that each include a respective set of probability values for connections between nodes of the observed graph;
    sampling the observed graph using the plurality of probability matrices to generate a respective set of random graph realizations corresponding to each of the probability matrices.

3. The method of claim 2 wherein the generative graph function comprises an assortative mixed membership stochastic block model (a-MMSBM).

4. The method of claim 3 wherein the sampling is Bernoulli sampling.

5. The method of claim 1 wherein:
    learning the predictive function using the random graph realizations comprises learning, for each of the random graph realizations, a respective set of function parameters for the predictive function; and
    predicting label probabilities for nodes of the random graph realizations comprises predicting, for each random graph realization, the label probabilities for the nodes using the respective set of function parameters learned for the random graph realization.

6. The method of claim 5 wherein the predictive function is learned using a graph convolution neural network (GCNN) and the function parameters include weights applied at convolution neural network layers of the GCNN.

7. The method of claim 6 wherein the respective set of function parameters for each random graph realization includes multiple sets of weights learned for the predictive function, wherein the label probabilities predicted for the nodes of each random graph realization includes a plurality of probabilities predicted based on each of the multiple sets of weights.

8. The method of claim 7 wherein the multiple sets of weights learned in respect of each random graph realization model are derived from a common set of weights using a Monte Carlo dropout.

9. The method of claim 6 wherein the predictive function is configured to perform a classification task and the labels predicted for the nodes specify a class from a plurality of possible classes.

10. The method of claim 6 wherein the predictive function is configured to perform a regression task and the labels predicted for the nodes specify a real-valued response variable.

11. The method of claim 1 wherein the observed graph is represented as an observed node feature matrix that includes feature vectors in respect of each of the nodes and an observed adjacency matrix that defines connections between the nodes, a subset of the nodes having labels, wherein deriving a plurality of random graph realizations of the observed graph comprises generating a plurality of constrained random variations of the observed node feature matrix.

12. A processing unit for predicting labels for nodes in an observed graph, the processing unit comprising a processing device and a storage storing instructions for configuring the processing unit to:
    derive a plurality of random graph realizations of the observed graph;
    learn a predictive function using the random graph realizations;
    predict label probabilities for nodes of the random graph realizations using the learned predictive function;
    average the predicted label probabilities to predict labels for the nodes of the observed graph.

13. The processing unit of claim 12 wherein the instructions configure the processing unit to derive a set of random graph realizations by:
    learning an generative graph function based on the observed graph, the generative graph function being configured to generate a plurality of probability matrices that each include a respective set of probability values for connections between nodes of the observed graph;
    sampling the observed graph using the plurality of probability matrices to generate a respective set of random graph realizations corresponding to each of the probability matrices.

14. The processing unit of claim 13 wherein the generative graph function comprises an assortative mixed membership stochastic block model (a-MMSBM).

15. The processing unit of claim 12 wherein:

the instructions configure the processing unit to learn the predictive function using the random graph realizations by learning, for each of the random graph realizations, a respective set of function parameters for the predictive function; and the instructions configure the processing unit to predict the label probabilities for nodes of the random graph realizations by predicting, for each random graph realization, the label probabilities for the nodes using the respective set of function parameters learned for the random graph realization.

16. The processing unit of claim 15 wherein the predictive function is learned using a graph convolution neural network (GCNN) and the function parameters includes weights applied at convolution neural network layers of the GCNN.

17. The processing unit of claim 16 wherein the respective set of function parameters for each random graph realization includes multiple sets of weights learned for the predictive function, wherein the label probabilities predicted for the nodes of each random graph realization includes a plurality of probabilities predicted based on each of the multiple sets of weights.

18. The processing unit of claim 16 wherein the predictive function is configured to perform a classification task and the labels predicted for the nodes specify a class from a plurality of possible classes.

19. The processing unit of claim 16 wherein the predictive function is configured to perform a regression task and the labels predicted for the nodes specify a real-valued response variable.

20. A machine learning system comprising:

a graph generation module configured to receive as inputs an observed graph and output a plurality of random graph realizations of the observed graph;

a graph convolution neural network configured to learn a predictive function using the random graph realizations to predict label probabilities for nodes of the random graph realizations, and average the predicted label probabilities to predict labels for the nodes of the observed graph.

* * * * *

UNITED STATES PATENT AND TRADEMARK OFFICE
CERTIFICATE OF CORRECTION

PATENT NO. : 11,531,886 B2
APPLICATION NO. : 16/697124
DATED : December 20, 2022
INVENTOR(S) : Zhang et al.

It is certified that error appears in the above-identified patent and that said Letters Patent is hereby corrected as shown below:

In the Specification

Column 4, Line 67 "represented as $G_{obs}=(X_{obs}, A_{obs})$, where $X_{obs} \in \mathbb{R}^{\times D}$"
Should read as -- represented as $G_{obs}=(X_{obs}, A_{obs})$, where $X_{obs} \in \mathbb{R}^{N \times D}$ --

Column 7, Line 40 "distributions. In this regard, $\pi_{ak} = \Pi_{ak}/\sum_{l=1}^{K} \Pi_{al}$, which results"
Should read as -- distributions. In this regard, $\pi_{ak} = \emptyset_{ak}/\sum_{l=1}^{K} \emptyset_{al}$, which results --

Column 7, Line 42 "$\theta_{ki}$, $\Pi_{ak} \geq 0$ are handled by taking the absolute value of the"
Should read as -- $\theta_{kl}$, $\emptyset_{ak} \geq 0$ are handled by taking the absolute value of the --

Column 7, Line 46 "mize the joint posterior in equation (3) over $\theta$ and $\Pi$. In"
Should read as -- mize the joint posterior in equation (3) over $\theta$ and $\emptyset$. In --

Column 9, Lines 29-34, the equation should read as

-- $$\{\hat{\pi}, \hat{\beta}\} = \arg\max_{\beta, \pi} p(\beta, \pi | \mathcal{G}_{obs})$$ --

Column 10, Lines 23-26, Equations (5) and (6) should read as
-- $H^{(1)} = \sigma(A_G X W^0)$       Equation (5); and $H^{(l+1)} = \sigma(A_G H^{(l)} W^{(l)})$       Equation (6) --

Signed and Sealed this
Twenty-fifth Day of April, 2023

Katherine Kelly Vidal
*Director of the United States Patent and Trademark Office*